April 7, 1953     A. M. CANDY     2,634,356
GRIPPING DEVICE FOR WELDING ELECTRODE
HOLDERS AND THE LIKE
Filed April 15, 1950     2 SHEETS—SHEET 1
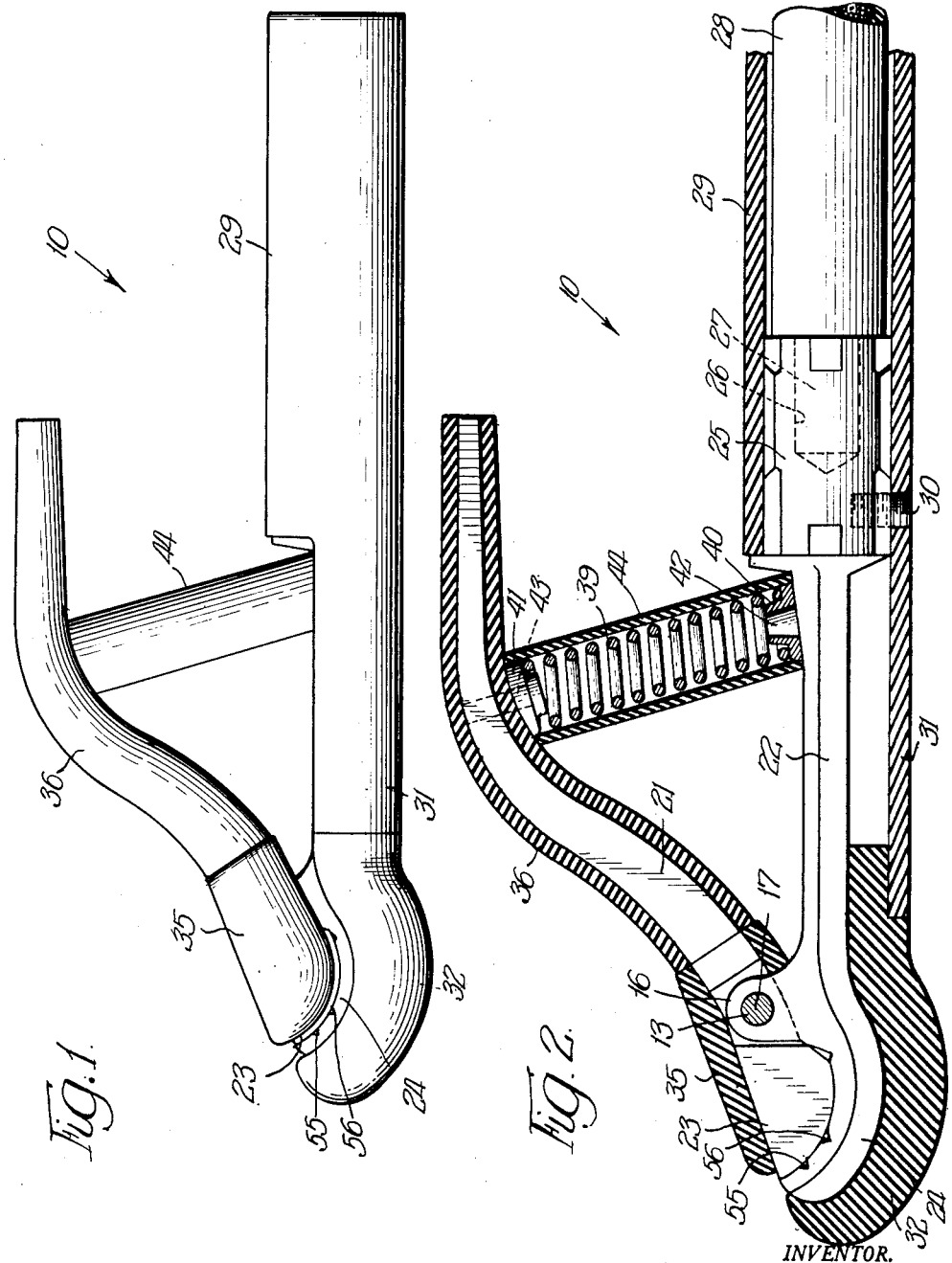
INVENTOR.
Albert M. Candy,
BY Robert R. Lockwood
ATT'Y.

April 7, 1953
A. M. CANDY
2,634,356
GRIPPING DEVICE FOR WELDING ELECTRODE
HOLDERS AND THE LIKE
Filed April 15, 1950
2 SHEETS—SHEET 2
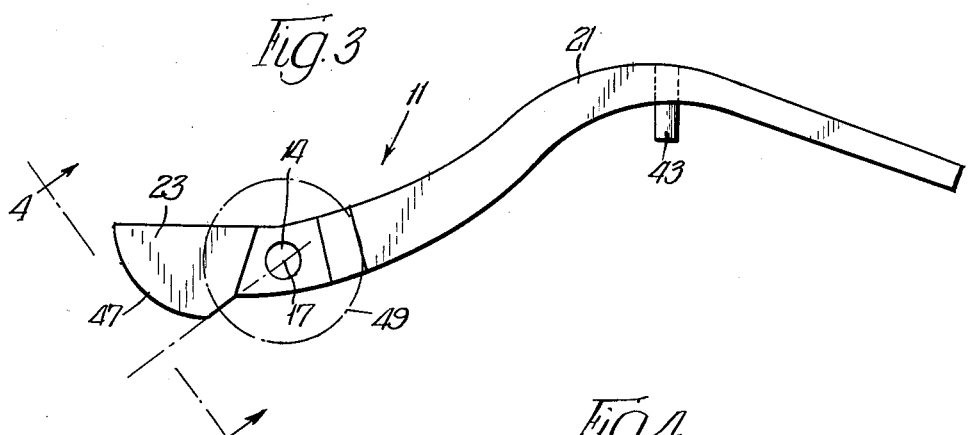
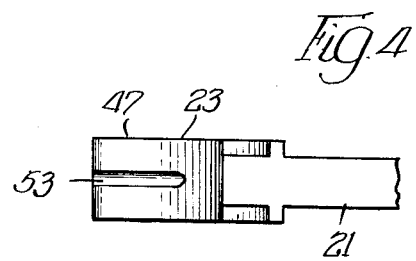
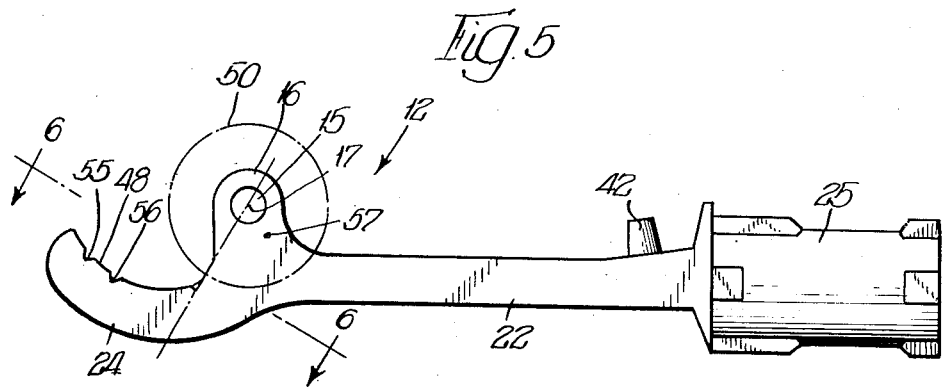
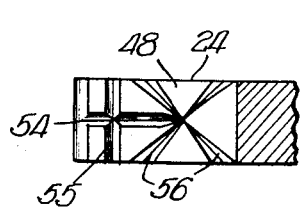
INVENTOR.
Albert M. Candy,
BY
Robert R. Lockwood
atty Patented Apr. 7, 1953

2,634,356

UNITED STATES PATENT OFFICE 2,634,356

GRIPPING DEVICE FOR WELDING ELECTRODE HOLDERS AND THE LIKE

Albert M. Candy, La Grange, Ill., assignor to National Cylinder Gas Company, Chicago, Ill., a corporation of Delaware Application April 15, 1950, Serial No. 156,223

13 Claims. (Cl. 219—8)

This invention relates, generally, to gripping devices and it has particular relation to welding electrode holders and similar mechanisms intended for engaging an object from opposite sides.

Among the objects of this invention are: To provide for gripping an object, such as a welding electrode, from opposite sides in a new and improved manner; to employ a pair of pivoted jaws for this purpose with the gripping surfaces of the jaws shaped so as to grip the electrode with the same force at any location and in any position between the jaws; to shape the jaw gripping surfaces so that they are at a uniform distance apart in any operative position; to shape the gripping surface of one jaw so that it is an involute of a base cylinder whose longitudinal axis coincides with the pivot axis of the jaws and the gripping surface of the other jaw coincides substantially therewith when the surfaces are juxtaposed; and to shape the gripping surfaces of the jaws as involutes of a base cylinder whose longitudinal axis coincides with the pivot axis of the jaws.

Other objects of this invention will, in part, be obvious and in part appear hereinafter.

This invention is disclosed in the embodiment thereof shown in the accompanying drawings and it comprises the features of construction, combination of elements and arrangement of parts which will be exemplified in the construction hereinafter set forth and the scope of the application of which will be indicated in the appended claims.

For a more complete understanding of the nature and scope of this invention, reference can be had to the following detailed description, taken together with the accompanying drawings, in which:

Figure 1 is a view, in side elevation, of an electrode holder in which the present invention is embodied;

Figure 2 is a view, similar to that shown in Figure 1, at a slightly enlarged scale, and showing the insulation around the members of the electrode holder in section;

Figure 3 is a view, in side elevation, of one of the members making up the electrode holder;

Figure 4 is a view taken generally along the line 4—4 of Figure 3;

Figure 5 is a view, in side elevation, of the other member making up the electrode holder; and Figure 6 is a detail sectional view taken generally along the line 6—6 of Figure 5.

Referring now particularly to the drawings, it will be observed that the reference character 10 designates, generally, a welding electrode holder which is formed, in part, by members 11 and 12, Figures 3 and 5, respectively, which are formed of good electrical conducting material such as cast bronze. Intermediate their ends the members 11 and 12 are pivoted on a pivot pin 13 which extends through an aperture 14 in the member 11 and through apertures 15 in arms 16 which project upwardly from the member 12 as shown in Figure 5. The pivot axis about which the members 11 and 12 rock with respect to each other is indicated at 17 as extending centrally through the apertures 14 and 15. Also, as shown in Figure 2, the axis 17 extends through the center of the pivot pin 13. Hereinafter reference will be made to the axis 17 and its relation to certain gripping surfaces of the members 11 and 12.

As illustrated more clearly in Figures 3 and 5, the members 11 and 12 include handles 21 and 22 at one end and jaws 23 and 24, respectively, at the other end. The handles 21 and 22 may have various forms, those shown being employed for illustrative purposes only. The handle 22 terminates in an enlarged end section 25 having a cylindrical opening 26, Figure 2, for receiving one end of a welding conductor 27. The welding conductor 27 is of conventional construction and is provided with a suitable insulating cover 28.

It is desirable to insulate the members 11 and 12 from accidental engagement with the work on which the welding operation is to be performed. For this purpose an insulating sleeve 29 extends over the enlarged end section 25 of the handle 22 and is coextensive for a limited extent with the insulating cover 28 of the welding conductor 27. The sleeve 29 may be secured to the handle 22 by a screw 30 which is threaded into the enlarged end section 25, as shown. At its forward end the insulating sleeve 29 has a partial cylindrical integral extension 31 which is coextensive with and overlies the intermediate portion of the handle 22. The jaw 24 is enclosed by an insulating covering 32. In like manner the jaw 23 at the forward end of the member 11 is provided with an insulating covering 35 and an insulating sleeve 36 is telescoped over the handle 21.

With a view to biasing the handles 21 and 22 apart so as to grip a welding electrode between the jaws 23 and 24 a coil compression spring 39 is positioned therebetween. At its lower end the spring 39 bears against an insulating button 40 while an insulating button 41 is located at its upper end. It will be understood that the insulating buttons 40 and 41 are employed to insulate the spring 39 from the handles 21 and 22. The insulating button 40 is centered on a boss 42 that may be cast integrally with the handle 22 while the insulating button 41 is centered on a pin 43 which extends through a suitable aperture in the handle 21. Surrounding the spring 39 is a flexible insulating sleeve 44. It is formed of rubber or like material which can flex readily when the handles 21 and 22 are moved toward each other.

In accordance with this invention, the jaws 23 and 24 are provided with gripping surfaces 47 and 48, respectively. As shown more clearly in Figures 3 and 5 of the drawings, the gripping surfaces 47 and 48 are curved surfaces. More particularly, the gripping surfaces 47 and 48 are involutes of base cylinders that are indicated by the broken lines at 49 and 50. The cylinders 49 and 50 have the same radius so that when the surfaces 47 and 48 are juxtaposed as indicated in Figures 1 and 2, they generally are in engagement throughout their entire areas. The pivot axis 17 coincides with the longitudinal axis of each base cylinder 49 and 50. While both of the gripping surfaces 47 and 48 are preferably involutes of the same base cylinder, the gripping surface 48 need not be a true involute. All that is required is that it coincide substantially with the gripping surface 47 when these gripping surfaces are juxtaposed.

When the gripping surfaces 47 and 48 are formed as described, they are at a uniform distance apart in any operative position or operative jaw opening. This is the preferred construction. Also, when the gripping surfaces 47 and 48 are formed as described, an electrode therebetween is gripped with the same force anywhere along the surfaces 47 and 48 regardless of its location between the jaws 23 and 24. For example, if an electrode having a diameter of ¼ inch is to be gripped, the handles 21 and 22 are moved toward each other and the spring 39 is compressed until the opening between the gripping surfaces 47 and 48 is slightly greater than ¼ inch. Then the electrode having a ¼ inch diameter is inserted therebetween. Since the gripping surfaces 47 and 48 are spaced uniformly apart, the electrode can be positioned anywhere between them, i. e. either close to the pivot pin 13 or adjacent the outer ends of the jaws 23 and 24. On release of the pressure against the handles 21 and 22, the spring 39 will move the gripping surfaces 47 and 48 into engagement with opposite sides of the electrode and will grip it with a force which is determined by the geometry of the electrode holder 10. Since the moment arm of the jaws 23 and 24 is the radius of the base cylinders 49 and 50, the gripping force applied by the spring 39 will be the same regardless of whether the electrode is placed close to the pivot pin 13 or is placed near the outer ends of the jaws 23 and 24.

As indicated, the gripping surface 47 is an involute of the base cylinder 49. An involute is defined as a curve traced by a point of a perfectly flexible inextensible thread kept taut as it is wound upon or unwound from another curve. In accordance with this invention the other curve is a cylinder and is also termed an evolute. In the case where the evolute is a cylinder as disclosed herein, if any one involute curve is rotated (in the unwrapping direction of the involute) about the center of the evolute cylinder, then in any position it will be parallel throughout its entire length with the entire portion of any other involute extending beyond the straight line drawn normal (in the wrapping direction) from the point of origin of the moved involute. It follows that, if two involute surfaces are provided having a common evolute surface and this evolute surface is a cylinder about the axis of which one of the involute surfaces is rotated away from or toward the other, the surfaces will be at a uniform distance from one another over their entire areas located beyond the normal drawn in the wrapping direction from the origin of the surface displaced in the unwrapping direction from the other surface, the distance in each case depending upon their relative positions or, as here, upon the relative positions of the members 11 and 12. As pointed out above, this construction is such that the effective lever arm from the pivot pin 13 to the gripping point of contact between the jaws 23 and 24 is always the same regardless of the size of the electrode or the location of the electrode between the jaws 23 and 24. Thus a much softer spring 39 can be used for biasing the gripping surfaces 47 and 48 toward each other. On the other hand, if a relatively stiff spring 39 is employed, a much greater pressure will be exerted on the electrode from opposite sides.

With a view to facilitating further the gripping of an electrode between the surfaces 47 and 48, they may be provided respectively with longitudinally extending grooves 53 and 54 as shown more clearly in Figures 4 and 6. In addition a transverse groove 55 can be provided in the gripping surface 48 of the jaw 24. Also diagonally extending grooves 56 can be provided in this surface of the jaw 24 to facilitate the gripping of an electrode at an angle to the longitudinal axis of the welding electrode holder 10.

It is preferred that the jaws 23 and 24 be provided with gripping surfaces 47 and 48, respectively, which are involutes of the base cylinder 49 or 50 in order that, for any jaw opening, the surfaces 47 and 48 will be at a uniform distance apart. Thus, when the handles 21 and 22 are moved apart, an object, such as a welding electrode, will be gripped with the same force regardless of its location anywhere along the surfaces 47 and 48. It has been pointed out that the surface 48 need not be a true involute surface and satisfactory results can be obtained. Further, it is pointed out that instead of employing the involute configuration, the gripping surfaces 47 and 48 may be of spiral configuration. When the spiral configuration is employed, while the surfaces 47 and 48 would not be at a uniform distance apart for any jaw opening, the spiral configuration can be selected so that these surfaces will approach uniformity in distance apart although complete uniformity is not obtainable. There are two disadvantages of the spiral configuration. One of these is that an object, such as a welding electrode, will not be held with the same pressure at various locations along the length of the jaws. While a given maximum size of electrode could be located between the jaws at their outer ends, because of the decreasing space therebetween, the same electrode could not be inserted therebetween at the inner ends of the gripping surfaces 47 and 48 when of spiral configuration.

While the surfaces 47 and 48 are illustrated as starting generally at the base or evolute cylinder 49 or 50, it will be understood that these surfaces can extend to positions within the base or evolute cylinder 49 or 50.

Where it is desired that the rate of separation of the surfaces 47 and 48 be increased over that which is permitted when the handles 21 and 22 are pivoted about the axis 17, which is the longitudinal axis of the base cylinder or evolute 49 or 50, provision can be made for pivoting the handles 21 and 22 about an axis which is eccentric relative to the axis 17. For example, as shown in Figure 5, the pivot axis may be shifted from that indicated at 17 to the axis indicated at 57. There would be a corresponding shift in the position of the axis for the handle 21 as will be understood readily. However, when the axis is shifted to the eccentric position, the construction has the disadvantage that the pressure exerted on an object between the gripping surfaces 47 and 48 would not be the same over their entire lengths and a maximum diameter of electrode could not be moved back into a position at the rear of the jaws 23 and 24 as is the case when the gripping surfaces 47 and 48 are involutes of the same base cylinder and they are pivoted about the longitudinal axis thereof.

While the present invention has been described particularly for use in gripping welding electrodes which have a circular cross section, it will be understood that the application of the present invention is not so limited. It may be employed in the construction of gripping and cutting pliers, bolt and wire cutters, tongs, clamping devices, etc.

Since certain changes can be made in the foregoing construction and different embodiments of the invention can be made without departing from the spirit and scope thereof, it is intended that all matter shown in the accompanying drawings and described hereinbefore shall be interpreted as illustrative and not in a limited sense.

What is claimed as new is:

1. In combination, a pair of cooperating pivoted jaws, and means for moving said jaws relatively toward each other to grip an object therebetween, the gripping surface of one of said jaws being an involute of a base cylinder whose longitudinal axis coincides with the pivot axis of said jaws and the gripping surface of the other jaw substantially coinciding with the gripping surface of said one jaw when said surfaces are in juxtaposed relation.

2. In combination, a pair of cooperating pivoted jaws, and a handle extending from each jaw for moving them relatively toward each other to grip an object therebetween, the gripping surface of one of said jaws being an involute of a base cylinder whose longitudinal axis coincides with the pivot axis of said jaws and the gripping surface of the other jaw substantially coinciding with the gripping surface of said one jaw when said surfaces are in juxtaposed relation.

3. In combination, a pair of cooperating pivoted jaws, and means for moving said jaws relatively toward each other to grip an object therebetween, the gripping surfaces of said jaws being involutes of a base cylinder whose longitudinal axis coincides with the pivot axis of said jaws.

4. A welding electrode holder comprising, in combination, a pair of pivoted jaws, and means for moving said jaws relatively toward each other for gripping a welding electrode therebetween, the gripping surface of one of said jaws being an involute of a base cylinder whose longitudinal axis coincides with the pivot axis of said jaws and the gripping surface of the other jaw substantially coinciding with the gripping surface of said one jaw when said surfaces are in juxtaposed relation.

5. A welding electrode holder comprising, in combination, a pair of pivoted jaws, and a handle extending from each jaw for moving them relatively toward each other for gripping a welding electrode therebetween, the gripping surface of one of said jaws being an involute of a base cylinder whose longitudinal axis coincides with the pivot axis of said jaws and the gripping surface of the other jaw substantially coinciding with the gripping surface of said one jaw when said surfaces are in juxtaposed relation.

6. A welding electrode holder comprising, in combination, a pair of pivoted jaws, and means for moving said jaws relatively toward each other for gripping a welding electrode therebetween, the gripping surfaces of said jaws being involutes of a base cylinder whose longitudinal axis coincides with the pivot axis of said jaws.

7. A welding electrode holder comprising, in combination, a pair of pivoted jaws, and means for moving said jaws relatively toward each other for gripping a welding electrode therebetween, the gripping surface of one of said jaws being an involute of a base cylinder whose longitudinal axis coincides with the pivot axis of said jaws and the gripping surface of the other jaw substantially coinciding with the gripping surface of said one jaw when said surfaces are in juxtaposed relation, at least one of said gripping surfaces having a generally longitudinally extending groove for receiving an electrode therein.

8. A welding electrode holder comprising, in combination, a pair of pivoted jaws, and means for moving said jaws relatively toward each other for gripping a welding electrode therebetween, the gripping surface of one of said jaws being an involute of a base cylinder whose longitudinal axis coincides with the pivot axis of said jaws and the gripping surface of the other jaw substantially coinciding with the gripping surface of said one jaw when said surfaces are in juxtaposed relation, the second mentioned gripping surface having grooves angularly disposed with respect to each other for gripping electrodes at different angles relative to said jaws.

9. A welding electrode holder comprising, in combination, a pair of pivoted jaws, a handle extending from each jaw for moving them apart, a coil compression spring between said handles biasing them apart and thereby said jaws toward each other for gripping a welding electrode therebetween, the gripping surface of one of said jaws being an involute of a base cylinder whose longitudinal axis coincides with the pivot axis of said jaws and the gripping surface of the other jaw substantially coinciding with the gripping surface of said one jaw when said surfaces are in juxtaposed relation.

10. A welding electrode holder comprising, in combination, a pair of pivoted jaws, a handle extending from each jaw for moving them relatively toward each other for gripping a welding electrode therebetween, the gripping surface of one of said jaws being an involute of a base cylinder whose longitudinal axis coincides with the pivot axis of said jaws and the gripping surface of the other jaw substantially coinciding with the gripping surface of said one jaw when said surfaces are in juxtaposed relation, and insulation extending over said handles and jaws and leaving said gripping surfaces free.

11. A welding electrode holder comprising, in combination, a pair of pivoted jaws, a handle extending from each jaw for moving them apart, a coil compression spring between said handles biasing them apart and thereby said jaws toward each other for gripping a welding electrode therebetween, the gripping surface of one of said jaws being an involute of a base cylinder whose longitudinal axis coincides with the pivot axis of said jaws and the gripping surface of the other jaw substantially coinciding with the gripping surface of said one jaw when said surfaces are in juxtaposed relation, and insulation extending over said spring, handles and jaws and leaving said gripping surfaces free.

12. In combination, a pair of cooperating pivoted jaws, and means for moving said jaws relatively toward each other to grip an object therebetween, at least a portion of the gripping surface of one of said jaws being an involute of a base cylinder and a cooperating portion of the other jaw having a surface that is in contact engagement with said surface of said one jaw over a substantial part of its entire area when said jaws are closed.

13. In combination, a pair of cooperating pivoted jaws, and means for moving said jaws relatively toward each other to grip an object therebetween, at least a portion of the gripping surface of each of said jaws being an involute of a base cylinder so that in any operative position of said jaws said portions of said surfaces are at a substantially uniform distance apart.

ALBERT M. CANDY.

REFERENCES CITED

The following references are of record in the file of this patent:

UNITED STATES PATENTS

| Number | Name | Date |
|---|---|---|
| 139,520 | Rigg | June 3, 1873 |
| 1,866,771 | Johnson | July 12, 1932 |
| 2,416,841 | Nowicke | Mar. 4, 1947 |
| 2,477,207 | Rinehart | July 26, 1949 |

FOREIGN PATENTS

| Number | Country | Date |
|---|---|---|
| 200,418 | Switzerland | Jan. 16, 1939 |